United States Patent [19]

Aliberti et al.

[11] Patent Number: 4,598,124
[45] Date of Patent: Jul. 1, 1986

[54] MASS POLYMERIZATION PROCESS FOR ABS POLYBLENDS

[75] Inventors: Vincent A. Aliberti, Wilbraham; Robert L. Kruse, Belchertown; Eduardo M. Valcarce, South Hadley, all of Mass.

[73] Assignee: Monsanto Company, St. Louis, Mo.

[21] Appl. No.: 527,137

[22] Filed: Aug. 29, 1983

Related U.S. Application Data

[63] Continuation of Ser. No. 348,474, Feb. 12, 1982, abandoned, which is a continuation-in-part of Ser. No. 265,293, May 23, 1981, abandoned.

[51] Int. Cl.[4] ............................................. C08F 279/04
[52] U.S. Cl. ......................................... 525/86; 525/316
[58] Field of Search ................................................ 525/86

[56] References Cited

U.S. PATENT DOCUMENTS

| | | | |
|---|---|---|---|
| 3,111,501 | 11/1963 | Thompson | 525/86 |
| 3,243,481 | 3/1966 | Ruffing et al. | |
| 3,337,650 | 8/1967 | Marcil | |
| 3,511,895 | 5/1970 | Kydonieus et al. | |
| 3,624,183 | 11/1971 | Leach | 525/86 |
| 3,627,855 | 12/1971 | Schott et al. | |
| 3,981,944 | 9/1976 | Okamoto et al. | |
| 4,009,227 | 2/1977 | Ott et al. | |
| 4,104,328 | 8/1978 | Swoboda | 525/86 |
| 4,141,932 | 2/1979 | Butler | |
| 4,228,051 | 10/1980 | Sakano | 525/86 |
| 4,243,765 | 1/1981 | Keskkula | 525/86 |
| 4,252,911 | 2/1981 | Simon | |
| 4,252,912 | 2/1981 | Tokas | |
| 4,254,236 | 3/1981 | Burk | |
| 4,277,574 | 7/1981 | Jastrzebski et al. | |
| 4,298,710 | 11/1981 | Ohya | 525/86 |

FOREIGN PATENT DOCUMENTS 863410 2/1971 Canada .

Primary Examiner—Paul R. Michl
Attorney, Agent, or Firm—Michael J. Murphy; R. Bruce Blance; William J. Farrington

[57] ABSTRACT

An ABS polymer comprising (A) a graft copolymer formed by graft polymerizing styrene and acrylonitrile monomers onto an initially ungrafted, low gel diene rubber and (B) a copolymer of said grafted monomers in which said graft copolymer is dispersed; said diene rubber comprising 3 to 25% by weight of such polymer with the polymerized acrylonitrile content thereof being 27 to 40% by weight.

4 Claims, No Drawings

MASS POLYMERIZATION PROCESS FOR ABS POLYBLENDS

BACKGROUND OF THE INVENTION

This application is a continuation of applicaton Ser. No. 348,474, filed Feb. 12, 1982, abandoned, which in turn is a continuation-in-part of application Ser. No. 265,293, filed May 23, 1981, now abandoned.

This invention relates to ABS polymers and particularly to such polymers with advantageous characteristics.

ABS polymers comprise a matrix phase copolymer comprising monoalkenyl aromatic and alkenyl nitrile monomers having dispersed therein a conjugated diene-based rubber grafted with the same monomers. Various processes have been utilized for the manufacture of such polymers including emulsion, suspension and mass polymerization techniques and combinations thereof. Although mass polymerized products exhibit desirable properties, this technique has a practical limitation upon the maximum degree of conversion of monomers to polymer which can be effected because of the high viscosities and accompanying power and equipment requirements, which are encountered when the reactions are carried beyond a fairly low degree of conversion.

In a typical ABS mass polymerization process styrene and acrylonitrile are copolymerized in the presence of a diene-based rubber. Initially the rubber is dissolved in the monomers and a continuous homogeneous phase prevails. When polymerization begins, the monomers are simultaneously copolymerized alone and also as a graft on the rubber backbone. As the monomers polymerize two phases appear: the polymer dissolved in monomer and the rubber dissolved in monomer. Initially the latter phase predominates and the smaller "polymer in monomer" phase is dispersed in the larger "rubber in monomer" phase. However as polymerization progresses the "polymer in monomer" phase becomes greater in volume. At this point the phenomenon of phase inversion occurs and the "rubber in monomer" phase becomes dispersed as discrete particles in a matrix of the "polymer in monomer" phase. Usually in a mass polymerization process, the rubber will contain occlusions of polymer/monomer which serve to swell the volume of the rubber particle. As polymerization progresses, monomer is converted to polymer, the viscosity of the mixture increases and greater power is needed to maintain temperature and compositional uniformity throughout the polymerizate.

Typical prior art processes for the continuous production of ABS polymers by a mass polymerization process are described in U.S. Pat. No. 3,243,481; 3,337,650; and 3,511,895.

The prior art processes, which involve the feeding of a solution of rubber in a mixture of styrene and acrylonitrile monomers to the polymerization mixture, have an inherent limitation in that they cannot produce polymers with a high rubber content. This is because although rubber dissolves readily in styrene, its solubility in a mixture of styrene and acrylonitrile monomers decreases with the concentration of acrylonitrile. It is found for example that styrene monomer can dissolve about 20% of its weight of a diene rubber whereas a monomer mixture containing 58% styrene and 42% acrylonitrile can dissolve less than 10% of its weight of the same rubber. Thus the amount of rubber that can be added in solution in the monomer mixture is restricted by the proportion of nitrile monomer. However for many purposes such as solvent resistance and toughness it is advantageous to have a proportion of acrylonitrile as high as 40% or more by weight.

The present invention provides a process by which ABS polymers with high proportions of both rubber and acrylonitrile may be obtained and this represents a significant advance in the art.

There also exists a need for a continuous mass polymerization process for ABS polymers with high conversion rates and low energy requirements.

It is the objective of the present invention to provide a process of high polymerization efficiency for ABS polymers having superior properties.

It is also an objective of the present invention to provide a continuous mass polymerization process for ABS polymers that can be operated to high conversion on a large scale.

It is a specific object of this invention to provide ABS polymers containing high levels of polymerized acrylonitrile and, optionally, high levels of rubber, which are formed by continuous mass polymerization using initially ungrafted rubbers of low gel content.

SUMMARY OF THE INVENTION

The present invention provides an ABS polymer comprising (A) a graft copolymer formed by graft polymerizing styrene and acrylonitrile monomers onto an initially ungrafted, low gel diene rubber and (B) a copolymer of said grafted monomers in which such graft copolymer is dispersed; said diene rubber comprising 3 to 25% by weight of said polymer; the polymerized acrylonitrile content of such polymer being 27 to 40% by weight. The ABS polymer is preferably formed by continuous mass polymerization and the diene rubber particle size in the ABS polymer is preferably from 0.2 to 10 microns.

For the purpose of clarity and brevity, in the general description of the process that follows styrene will represent the monoalkenyl aromatic monomer and acrylonitrile the alkenyl nitrile monomer. It is understood however that the invention is not so limited.

In the present process the rubber is dissolved in styrene monomer in amounts of 3 to 33% and preferably 10 to 30% by weight and this solution is charged to the reactor which provides a continuous polymerization zone containing a polymerizing mixture with a substantially uniform composition throughout. The reactor operates at a steady state with a polymer solids level above that at which phase inversion occurs and up to 70% polymer solids. Operation at such a polymer solids content ensures that upon addition, the rubber immediately forms small particles containing a monomer component, dispersed in the partially polymerized reaction mixture. The polymer solids level of the polymerizing mixture is calculated by placing a weighed sample, (about 2–3 gm), of the mixture under a high vacuum of about 75 cm of mercury at 200° C. for about 10 minutes and then re-weighing. It is found that, using this technique the monomer content (all species) remaining is less than 0.5% and substantially all monomer is removed within 30 seconds such that polymerization is not significantly advanced during the polymer separation. What remains is polymeric and the percentage of the sample weight that this represents is the polymer solids of the polymerizing mixture at that time.

Because acrylonitrile is separately but simultaneously fed and because the point of phase inversion for the system has been passed such that the rubber disperses as particles as it enters the reaction mixture, the process has the capability of employing high rubber concentrations while still realizing a high acrylonitrile concentration in the final ABS composition.

Preferred ABS molding compositions have high gloss and an average rubber particle size less than about 0.5 microns and most preferably 0.2 to 0.4 microns. Conventional ABS polymers having rubber particles this small however lack toughness. Raising the acrylonitrile content of such ABS polymers from the conventional 24% or thereabouts to the range of about 27 to 40% permits these small rubber particles effectively to toughen such an ABS polymer to an unexpected degree.

The continuous, stirred reactor that provides a polymerization mixture with a substantially uniform composition in which phase inversion has already occurred is an important process feature in that it allows the rubber to be dispersed in the form of particles as it enters the reaction mixture. In this way the separately added acrylonitrile stream does not affect the rubber particle formation.

It will be recognized then that the present process requires a reactor that is stirred so as to give a reaction mixture with a substantially uniform composition throughout and differs from processes without such uniformity of composition in the reactor such as continuous plug-flow mass polymerization processes, poorly back-mixed continuous processes or batch mass/suspension processes. In such systems the rubber content must be below 15% and the acrylonitrile content cannot go beyond about 25% if precipitation of the rubber is to be avoided. Adding acrylonitrile after phase inversion in a plug flow system does not solve the problem because it leads to the formation of inhomogeneous polymers and even, in some cases, to incompatible phases in the final ABS polymer.

The process of the invention can employ a single reactor in which case the polymer solids level at which the process is operated should be from 50 to 70%. Alternatively a plurality of reactors can be employed with the first being a reactor of the type described above operating at a steady polymer solids level of 35 to 55% followed by one or a series of reactors operating in a continuous mode in which the polymerization is advanced to the required conversion. Where a reactor chain is used it will of course be necessary to provide for monomer addition to maintain the composition of the polymer produced in the desired range.

The polymer solids at which the reaction is conducted is limited by two practical considerations. At the lower end of the range, (as has been indicated above), it is important that the polymer solids level in the reactor, (or the initial reactor where a series of reactors is used), to which the monomer streams are added be such that the polymer/monomer phase has a greater volume than the rubber/monomer phase such that the rubber/monomer immediately forms a dispersed phase. In practice this implies a monomer to polymer conversion level of about 35%. At the upper level, the practical constraints of power requirements for the reactor agitator place a limit of about 70% solids. This does not necessarily imply a similar conversion level since up to 50% and preferably from 10 to 30% by weight of a suitable solvent, (based on the weight of the monomers fed to the reaction), can be used to dilute the reaction mixture to a point at which, even with up to 99% monomer to polymer conversion, the power requirements are not excessive.

Some or all of the diluent can be introduced with the rubber in styrene stream either as an added component or by the use of an ungrafted, low gel rubber which is already dissolved in a suitable solvent such as hexane or cyclohexane. In many cases rubber solutions containing up to 50% and preferably 5 to 30% by weight of solvent provide a very convenient means of handling low molecular weight rubbers which tend to be very tacky solids or even liquids in the undissolved form. Diluent can also be added separately or in the acrylonitrile stream.

The diluents can be liquid aromatic hydrocarbons containing 6 to 10 carbon atoms, e.g., benzene, toluene, xylene, ethyl benzene, para cymene, cumene or mixtures thereof. Other organic solvents such as saturated aliphatic hydrocarbons, e.g., hexane, cyclohexane, cyclopentane and others having 5 to 7 carbon atoms, ketones, e.g., methyl ethyl ketone, methyl cyclopentane, methyl isobutyl ketone, cyclohexane or methyl propyl ketone can also be used.

Those ABS polymers having a rubber particle size, of from about 0.1 to 0.5 micron; a nitrile monomer content of about 27 to 40 or more preferably about 33%; a rubber content of about 14 to 25%; and a graft level of 150 to 200% generally require a lower molecular weight matrix phase copolymer to insure proper flow properties, e.g., a molecular weight of about 3,000 to 60,000 ($M_n$) or approximately 5,000 to 150,000 ($M_v$). The relationships between the number average, ($M_n$); weight average, ($M_w$); and viscosity average ($M_v$); molecular weights and the calculation of such parameters are set out in "Crystalline Olefine Polymers" by Raff and Doak, Interscience Publishers, 1965, at page 443. The rubber molecular weight generally quoted herein is the viscosity average molecular weight and is calculated using the technique described by V. H. Lange and H. Bauman in Angewandt Makromol. Chemie, Vol. 14, 1970.

After polymerization has progressed to the desired conversion level, the residual monomer is stripped from the polymer. This operation, which is the same whether a single reactor or a series of reactors is employed in the polymerization state, is conventionally done in a separate device such as a wiped film devolatilizer or a falling strand devolatilizer.

DESCRIPTION OF THE PREFERRED EMBODIMENTS

The Monomer Formulation

The monomer formulation comprises, at least principally, a monoalkenylaromatic monomer and an ethylenically unsaturated nitrile monomer. The monoalkenylaromatic monomer comprises at least one monomer of the formula:

where Ar is selected from the group consisting of phenyl, halophenyl, alkylphenyl and alkylhalophenyl and mixtures thereof and X is selected from the group consisting of hydrogen methyl and ethyl groups.

Exemplary of the monoalkenyl aromatic monomers that can be employed in the present process are styrene and substituted styrenes such as o-, m-, and p-methyl styrenes, 2,4-dimethylstyrene, the corresponding ethyl styrenes, p-tert-butyl styrene, alpha-methyl styrene, alphaethylstyrene, alpha ethyl-p-methylstyrene, vinyl naphthalene, an ar-halo mono-alkenyl aromatic monomer such as o-chlorostyrene, m-chlorostyrene, p-chlorostyrene, o-bromostyrene and 2,4-dibromostyrene, and ring-alkyl, ring-halo-substituted styrenes, e.g., 2-methyl-4-chlorostyrene and 2,6-dichloro-4-methystyrene. If so desired, mixtures of such monoalkenyl aromatic monomers may be employed.

Exemplary of the unsaturated nitriles or alkenyl nitrile monomers which may be used are acylonitrile, methacrylonitrile, ethacrylonitrile and mixtures thereof.

Exemplary of the monomers which may be interpolymerized with the monoalkenylaromatic monomer and unsaturated nitrile monomer are alpha- or beta-unsaturated mono-basic acids and derivatives thereof, e.g., acrylic acid, methyl acrylate, ethyl acrylate, butyl acrylate, 2-ethylhexyl acrylate, methacrylic acid and the corresponding esters thereof, such as methyl methacrylate, acrylamide and methacrylamide; vinyl halides such as vinyl chloride, vinyl bromide and vinylidene chloride, vinylidene bromide; vinyl esters such as vinyl acetate and vinyl propionate, dialkyl maleates or fumarates such as dimethyl maleate, diethyl maleate, dibutyl maleate; and maleic anhydride.

The monomer components of the polymerizing mixture comprise at least 40% by weight of the monoalkenylaromatic monomer and preferably at least 5% by weight of the unsaturated nitrile and preferably at least 10% by weight thereof. In practice it is desirable that the monomeric component of the polymerizing mixture contains 40 to 95% and preferably 60 to 85%, by weight of the alkenyl aromatic hydrocarbon and 60 to 5% and preferably 60 to 15% and most preferably from 40 to 25% by weight of the unsaturated nitrile.

It is well known that styrene and acrylonitrile monomers can be copolymerized in varying proportions. A monomer formulation having about 76 parts styrene and about 24 parts acrylonitrile, e.g., will polymerize by mass polymerization with reflux of monomers to produce a polymer of this composition at any conversion because the monomers in these proportions form an azeotrope. By definition then the azeotropic composition is the composition wherein the polymer being formed is the same as that of the unpolymerized monomer formulation. It is known that proportions other than the azeotrope above of the two monomers can be used to produce polymers of uniform composition. Basdekis, C. H., "ABS Plastics". Reinhold, N. Y., 1964, describes methods of producing ABS polymers having styrene/acrylonitrile SAN matrix polymers of uniform composition using monomer formulations other than the azeotropic SAN composition of 76/24. Muller, R. G., "ABS Resins", Report No. 20, Stamford Research Institute, Menlo Park, Calif., also describes processes for the production of ABS polymers having uniform SAN matrix polymers. In such copolymerization, one monomer tends to enter the polymer molecule faster than the other monomer because of their differences in reactivity. As the conversion of the monomer formulation progresses one monomer is depleted faster than the other and the monomer composition changes with conversion. Therefore a SAN matrix phase having uniform monomer composition can be produced by using (a) the azeotropic monomer formulation; (b) by keeping the monomer formulation in the reactor uniform by adjusting the proportions of the monomers charged and by (c) limiting the level of conversion so that the differential polymerization rate does not have a material effect on composition. Using this last technique it has been found that the 76/24 SAN formulation can be run to about 100% conversion; and the 35/65 SAN and 90/10 SAN formulations to about 30 to 40% conversion.

Generally however, when the acrylonitrile content of the ABS polymer is to be higher than 24% then more than 24% by weight acrylonitrile must be added to the reactor to bring the acrylonitrile concentration of the polymer into the preferred range.

The Diene Rubber

The preferred rubbers are ungrafted, low gel diene rubbers, including mixtures of diene rubbers, i.e., any rubbery polymer (a rubbery polymer having a second order transition temperature not higher than 0° centigrade, preferably not higher than −20° centigrade, as determined by ASTM Test D-746-52T) of one or more of the conjugated, 1,3-dienes, e.g., butadiene, isoprene, 2-chloro-1,3 butadiene, 1 chloro-1,3 butadiene, piperylene, etc. Such rubbers include copolymers and block copolymers of conjugated 1,3-dienes with up to an equal amount by weight of one or more copolymerizable monoethylenically unsaturated monomers, including monoalkenyl aromatic hydrocarbons such as styrene and substituted styrenes such as aralkylstyrenes, including o-, m- and p-methylstyrenes, 2,4-dimethylstyrene, the corresponding aromatic ethylstyrenes, p-tert-butylstyrene, etc.; alphamethylstyrene, alphaethylstyrene; alpha-methyl-p-methyl styrene, vinyl naphthalene; arhalomonoalkenyl aromatic hydrocarbons such as o-, m- and p-chlorostyrene, 2,4-dibromostyrene, and 2-methyl-4-chlorostyrene; acrylonitrile, methacrylonitrile; ethacrylonitrile; alpha or beta-unsaturated monobasic acids and derivatives thereof, e.g., acrylic acid, methyl acrylate, ethyl acrylate, butyl acrylate, 2-ethylhexyl acrylate, methacrylic acid and the corresponding esters thereof, such as methyl methacrylate, acrylamide and methacrylamide; vinyl halides such as vinyl chloride, vinylidene bromide; vinyl esters such as vinyl acetate and vinyl propionate, dialkyl maleates or fumarates such as dimethyl maleate, diethyl maleate, dibutyl maleate; and maleic anhydride.

A useful group of rubbers are the stereo-specific polybutadiene rubbers formed by the polymerization of 1,3-butadiene. These rubbers have a cis-isomer content of about 30–98% and a trans-isomer content of about 70–2% and generally contain at least about 85% of polybutadiene formed by 1,4 addition with no more than about 15% by 1,2 addition. Mooney viscosities of the rubber (ML-4, 100° C.) can range from about 0 to 70 with a second order transition temperature of from about −50° C. to −105° C. as determined by ASTM Test D-746-52T.

The ungrafted diene rubber used in preparing the grafted diene rubber is a styrene soluble low gel diene rubber of the type described above. Such rubbers are typically available commercially from Firestone Tire and Rubber Company as Diene TM 35 and have a level of styrene-insoluble components of less than 0.05%. The term low gel as used in this application means essentially gel-free insofar as containing less than 0.05 wt.

% of components which are insoluble in styrene monomer. The stereospecific polybutadiene rubbers are preferred for optimum physical properties of the polymer.

The diene rubbers used in the diene grafted rubber is of the type described above. A preferred group of rubbers are those consisting essentially of 75 to 100% by weight of butadiene and/or isoprene and up to 25% by weight of a monomer selected from the group consisting of monovinylidene aromatic hydrocarbons (e.g. styrene) and unsaturated nitriles (e.g., acrylonitrile), or mixtures thereof. The diene rubber may contain up to about 2% of a crosslinking agent based on the weight of the rubber monomer or monomers. The crosslinking agent can be any of the agents conventionally employed for crosslinking diene rubbers, e.g., divinylbenzene, diallyl maleate, diallyl fumarate, diallyl adipate, allyl acrylate, allyl methacrylate, diacrylates and dimethacrylates or polyhydric alcohols, e.g., ethylene glycol dimethacrylate, etc.

As indicated above the rubber content of the rubber in styrene solution fed to the reactor can be from 3 to 33% by weight and preferably 10 to 30% by weight. This can produce a rubber content in the ABS polymer of up to about 30% by weight such as for example polymers with a rubber content of from 10 to 30% by weight. The process of the invention is particularly useful in the production of ABS polymers with from 14 to 25% by weight of rubber.

The rubber content of the ABS polymer, which is expressed in terms of the weight of the rubber itself rather than of the grafted rubber produced during polymerization, is not necessarily the same as that charged to the reaction mixture. This is because the rubber is necessarily in the polymeric part of the reaction mixture such that removal of unreacted monomer after polymerization has reached the desired level, will result in a correspondingly higher proportion of rubber in what remains. The conversion of monomers to polymer can be run at about 30 to 99%. If monomer separation is carried out after only 50% conversion of monomers to polymer then the rubber content would be increased by about 100% over that which would be obtained if the polymerization were allowed to proceed till 100% conversion was reached. Hence, the rubber content of the ABS polymer can be controlled readily by the weight percent fed and the conversion level of the monomers before separating the residual monomers.

Rubbers with viscosity average molecular weights above about 200,000 generally produce rubber particle sizes in the range of 1 to 10 microns, preferably 1 to 5 microns. It has been found however that rubber particle sizes less than 1 micron in weight average diameter are readily formed in the present process if the diene rubbers have a viscosity average molecular weight ranging from 5,000 to 150,000, preferably 5,000 to 50,000, and most preferably from 20,000 to 30,000, for particles in the range of 0.2 to 0.5 microns. Generally, it is desirable that the rubber molecular weight be lower than the molecular weight of the graft copolymer to prepare polymers having rubber particles less than one micron in diameter.

The dispersed rubber phase increases the toughness of the ABS polymer. In general the impact strength of such polymers increases with the weight percent rubber dispersed in the polymer. The impact strength is also affected by the size of the dispersed rubber particles with higher impact strength being provided by particles with weight average particle diameters in the range of 0.5 to 10 microns.

The weight average diameter of the rubber particles also affects gloss with smaller particles giving high gloss and the larger particles giving low gloss to molded articles or sheet. One must balance impact strength and gloss requirements in selecting an optimum rubber particle size. With the particle size range of 0.1 to 10 microns, rubber particles with the range of 0.1 to 5 microns, and particularly from 0.2 to 2 microns are most preferred for the best balance of impact strength and gloss.

Weight average particle diameter as discussed herein is measured using a photosedimentometer and the published procedure of Graves, M. J. et al., "Size Analysis of Subsieve Powders Using a Centrifugal Photosedimentometer", British Chemical Engineering 9:742–744 (1964). A Model 3000 Particle Size analyzer from Martin Sweets Co., 3131 West Market Street, Louisville, Ky. was used to determine the particle sizes described herein.

The Matrix Phase Of The Polymer

In the present invention, the monomer formulation comprising at least principally a mixture of a monoalkenylaromatic monomer and an ethylenically unsaturated nitrile monomer will polymerize readily to form copolymers of the matrix phase in the presence of a dispersed rubber phase. Optionally minor proportions of other monomers may be present in the copolymer. The copolymer in the partially polymerized mixture is formed as a free, or matrix phase polymer and as a polymer grafted on the diene rubber particles. These matrix phase and grafted copolymers will have about the same composition for a given formulation.

Continuous Mass Polymerization

The polymerization may be initiated by any free radical generating initiator that promotes grafting and is activated at the contemplated reaction temperatures. Suitable initiators include peresters and peroxycarbonates such as tert-butyl perbenzoate, tert-butyl peroxy isopropyl carbonate, tert-butyl peroctoate, tert-butyl peroxy isononoate, tert-butyl 2-ethylhexyl monoperoxy carbonate, and mixtures thereof.

The initiator is generally included within the range of 0.001 to 3.0% by weight and preferably on the order of 0.005 to 1.0% by weight of the polymerizable material, depending primarily upon the monomer present.

The acrylonitrile monomer is charged to the reactor in an amount such that the partially polymerized mixture in the reactor contains about 15 to 60% by weight of acrylonitrile based on the total monomers charged. This mode of operation will cause the ABS polymer to be higher in acrylonitrile content bringing it into a preferred range of about 25 to 40% by weight.

As is well known, it is often desirable to incorporate molecular weight regulators such as mercaptans, halides and terpenes in relatively small percentages by weight, on the order of 0.001 to 1.0% by weight of the polymerizable material. In addition, it may be desirable to include relatively small amounts of antioxidants or stabilizers such as the conventional alkylated phenols. Alternatively, these may be added during or after polymerization. The formulation may also contain other additives such as stabilizers, plasticizers, lubricants, colorants and non-reactive preformed polymeric materials which are suitable or dispersible therein.

The process of the invention can be operated using a single reactor with a single reaction zone wherein the rubber-in-styrene solution and the acrylonitrile feed streams are fed continuously to a reactor operating at a polymer solids level above that at which phase inversion occurs and up to about 70% or, expressed differently at a 30 to 99% conversion of said total monomers fed, followed by recovery of the ABS polymers.

In a preferred process the reaction is carried out in two reactors, the first, A, being stirred so as to give a reaction mixture with a substantially uniform composition throughout and operating at 35–55% polymer solids content and the second reactor B, being a continuous mass reactor operating at 55–70% polymer solids content. This preferred process is now set forth in more detail.

Reactor A

A first partially polymerized mixture is formed in Reactor A by simultaneously and continuously charging to the reactor: (1) a solution of styrene monomer having dissolved therein about 3 to 33% by weight of a diene rubber with a molecular weight ($M_v$) of from 5,000 to 50,000 and (2) a separate feed-stream of acrylonitrile monomer, the reactor being stirred to give a mixture with a substantially uniform composition. The reactor operates at about 30 to 50% steady state monomer to polymer conversion (from 35 to 55% polymer solids content), such that the rubber becomes dispersed directly on addition as rubber particles having a weight average particle size of about 0.1 to 10 microns.

The monomers are polymerized at temperatures of from about 90° to 180° C. and at an operating pressure of from 0.7 to 14 kg/sq.cm and at least a portion of the monomers polymerized are grafted as superstrate copolymer molecules on the diene rubber.

Although the amount of polymeric superstrate grafted onto 100 parts of the rubber substrate may vary from as little as 10.0 parts by weight to as much as 200.0 parts and even higher, the preferred graft copolymers will generally have a superstrate to substrate weight ratio of about 20 to 200:100 and most desirably about 50 to 150:100. With graft ratios about 50 to 150:100, a highly desirable degree of improvement in various properties is generally obtained.

In reactor A, one must (1) form and disperse the rubber particle, and (2) graft the rubber particle while maintaining its size and morphology or structure. Some monomer/polymer phase is often occluded in the rubber particles. The amount of such occluded monomer-polymer phase is held at a constant level by steady state polymerization. It has been found that the higher the volume of occlusion within the rubber particle the more efficiently the rubber phase is used in toughening the polymer. The rubber particle acts much as a pure rubber particle if the occlusions are controlled at a level of about 0.25 to 2.5 parts by weight based on the particle weight. The occluded monomers also polymerize and begin to form monomer/polymer components inside the rubber particles.

The rubber particle is also grafted externally, stabilizing its structure as to size and its dispersability in the monomer-polymer phase. The initial reactor forms a first partially polymerized mixture of a monomer-polymer phase having the rubber phase described above dispersed therein.

Reactor B

Reactor (B) is preferably a continuous stirred reactor of the type used as Reactor A or a train of such reactors to carry the conversion up to the desired level which is generally from 55 to 99%, and preferably 55–80%, monomer to polymer and up to 70% polymer solids in the reaction mixture.

Reactor B preferably operates at a temperature of from 110° to 180° C. and an operating pressure of from 0.7 to 14.0 kg/sq.cm. The polymerization reaction is exothermic and cooling may be provided by vaporization of a part of the monomer from the reacting mass. However if the target composition is above the S/AN azeotrope it may be necessary to maintain the desired monomer proportions in Reactor B by use of a separate feed of monomers in the appropriate concentrations. Additionally or alternatively cooling can be provided by reactor jackets. Cooling by feeding the condensed recycle monomer into Reactor B may also be provided. It may also be appropriate to use as Reactor B a continuous flow-through reactor provided with efficient agitation. The cooling mechanisms discussed above are also effective with such a reactor. As material progresses through such a reactor, the amount of polymer continuously increases, the amount of monomer decreases, (via polymerization and vaporization losses), and the temperature progressively increases from inlet to outlet stages. To accommodate the natural swell of the reacting mass and to provide space for vapor disengagement, such a reactor is usually run at fillage of about 15 to 90%, preferably, 40 to 75% of its volume.

Recovery of ABS Polymer

The partially polymerized mixture exiting the single reactor (where only one is used), or the final reactor if a series is used, may be subjected to one or more stages of devolatilization to remove the remaining unreacted monomers. Such devolatilization is conducted in known manner in any desired devolatilizer such as a wiped film or falling strand type. The devolatilization treatment is generally conducted at temperatures of from about 140° to 280° C., at reduced pressures of from 0.01 to 700 mmHg absolute, preferably at from about 180° to 250° C., and a pressure of from 2 to 200 mmHg abs. The partially polymerized mixture can be preheated before devolatilization to reach the devolatilization temperatures desired by passing through a conventional tube and shell heat exchanger or the like. The product of the devolatilization state is a polymer composition with a residual monomer level reduced to less than about 2.0% by weight and desirably to less than about 0.4% by weight.

After removal of the devolatilized polymer from the devolatilization state generally in the form of a melt it is formed into strands or other shapes by the use of stranding dies or other conventional means and thereafter cooled and cut or pelleted into the desired final size and stored or packaged for shipment. The final operations can all be conducted in conventional manner through the use of known equipment and devices.

The following examples are set forth to illustrate more clearly the principles and practice of this invention to one skilled in the art. There is no intention to be restrictive but merely illustrative of the invention herein disclosed.

EXAMPLE 1

A diene rubber of 90% butadiene and 10% styrene, (9.8 parts), was dissolved in 46.8 parts of styrene monomer to form a monomer-rubber solution. The solution was fed to a first reactor that was stirred so as to maintain an essentially uniform composition throughout. The reactor which had a one liter capacity was continuously fed with a separate feed stream of 34.2 parts of acrylonitrile, said first reactor running at a steady state conversion of about 44% polymer solids at 125° C. About 0.15 parts of terpinoline and 0.03 parts of t-butyl peroxy isononoate was added to the monomer rubber solution during feeding to the first reactor.

The feed streams were added continuously to the first reactor such that the feed streams had an average residence time or pass-through time of about 1.3 hours in the reactor, maintaining a steady state monomer to polymer conversion of about 34%, providing about 44% polymer solids in the first reactor.

A partially polymerized reaction mixture from the first reactor was fed continuously to a second 1 liter reactor operating at 123° C. and a steady state manner to a monomer to polymer conversion of about 57%, with a polymer solids content of about 61%, and an average feed dwell (or pass-through) time of about 2.3 hours. A second feed stream of 8.8 parts styrene and 0.2 parts terpinoline was added to the second reactor with the partially polymerized reaction mixture from the first reactor to ensure a homogenous styrene acrylonitrile matrix copolymer and graft copolymer. The parts fed total 100 parts and represent the relative ratios of feed materials being fed and polymerized to form the ABS polymer. The first reaction zone is hence running with a feed comprising about 58% styrene monomer and 42% acrylonitrile whereas the second reactor is fed with a mixture comprising about 62% styrene and 38% acrylonitrile. The reactor mixture withdrawn from the second reactor was devolatilized continuously in a wiped film devolatilizer at 410° F. (210° C.) and 15 cm of Hg to provide an ABS polymer having a rubber content of about 17% and a rubber particle size of about 1.0 micron. The matrix and graft copolymers had an acrylonitrile content of about 30% and a molecular weight of about 164,000 $M_\nu$. The Izod impact strength was 320 J/m (6.0 ft.lb./in.) providing an ABS polymer of superior toughness and great utility.

EXAMPLES 2-6

Thirteen parts of a polybutadiene diene rubber of a different molecular weight from that used in Example 1 were dissolved in 40 parts of styrene and 21 parts of ethyl benzene. About 0.13 parts of a tert-butyl peroctoate catalyst were added to the solution which was charged continuously to a polymerizing mixture with a substantially uniform composition in a single stirred reactor operating at 57% polymer solids; (69% monomer to polymer conversion); a stirring rate of 40 rpm; a temperature of 116° C.; and an average flow through rate of about 0.9 hours. A separate stream of 24 parts of acrylonitrile was added to the reactor simultaneously with the styrene-diluent-rubber stream. The monomer formulation being fed to the polymerization mixture was about 63% styrene and 37% acrylonitrile and this provided a matrix and graft polymer with an acrylonitrile content of about 30% by weight based on the monomers polymerized.

|  | EXAMPLES | | | | |
|---|---|---|---|---|---|
|  | 2 | 3 | 4 | 5 | 6 |
| Rubber Molecular Weight (kg/mol) ABS Polymer[1] | 80 | 62 | 48 | 32 | 8 |
| % Rubber | 18 | 17 | 18 | 17 | 17 |
| % Gel[2] | 29 | 26 | 23 | 20 | 21 |
| RPS[3] | 0.8 | 0.6 | 0.5 | 0.3 | 0.1 |
| % AN[4] | 31 | 29 | 29 | 31 | 30 |
| Matrix[5] Properties | 145 | 145 | 145 | 145 | 145 |
| Izod Impact J/M | 138 | 96 | 75 | 49 | 10 |
| Tensile Strength at Yield $MP_A$ | 25 | 24 | 24 | 23 | 21 |

[1]ABS polyblend polymer analysis
[2]% gel-rubber plus graft and occlusions
[3]RPS-weight average rubber particle size in microns
[4]% AN-% acrylonitrile in polymer matrix
[5]Matrix phase molecular weight ($M_\nu$)

It is evident from the data that rubber particle size can be reduced by reducing the molecular weight of the rubber; however, molded toughness can be maintained down to rubber particle size of about 0.3 micron or less. The toughness can be readily increased by increasing the rubber content as high as about 25% within the present process.

We claim:
1. An ABS polymer comprising:
   (A) a graft copolymer formed by graft polymerizing styrene and acrylonitrile monomers onto an intially ungrafted, low gel diene rubber; and
   (B) a copolymer of said grafted monomers in which said grafted copolymer is dispersed; said diene rubber comprising 3 to 25% by weight of said polymer; the polymerized acrylonitrile content of said polymer being 27 to 40% by weight; said A and B simultaneously formed by continuous mass polymerization from a substantially uniform reaction composition.
2. The polymer of claim 1 wherein the particle size of said diene rubber in said polymer is from 0.1 to 10 microns.
3. The polymer of claim 1 wherein the particle size of said diene rubber is from about 0.8 microns to about 10 microns.
4. The polymer of claim 1,2 or 3 wherein said diene rubber comprises from about 14 to about 25% by weight of said polymer.

* * * * *